(12) United States Patent
Modrzejewski et al.

(10) Patent No.: US 10,371,243 B2
(45) Date of Patent: Aug. 6, 2019

(54) COMPOSITE AND METAL HYBRID GEAR

(71) Applicant: Bell Helicopter Textron Inc., Fort Worth, TX (US)

(72) Inventors: Brian Modrzejewski, Keller, TX (US); Doug Mueller, Coppell, TX (US); Brad Ekstrom, Fort Worth, TX (US); Robert P. Wardlaw, Keller, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 140 days.

(21) Appl. No.: 14/735,577

(22) Filed: Jun. 10, 2015

(65) Prior Publication Data

US 2016/0363206 A1 Dec. 15, 2016

(51) Int. Cl.
| | |
|---|---|
| *F16H 55/06* | (2006.01) |
| *B64C 27/12* | (2006.01) |
| *F16H 55/12* | (2006.01) |
| *F16B 11/00* | (2006.01) |

(52) U.S. Cl.
CPC ............ *F16H 55/06* (2013.01); *B64C 27/12* (2013.01); *F16B 11/006* (2013.01); *F16H 55/12* (2013.01); *F16H 2055/065* (2013.01)

(58) Field of Classification Search
CPC .... F16H 55/06; F16H 55/12; F16H 2055/065; B32B 37/06; B32B 37/10; B32B 37/12; B32B 37/24; B32B 38/0004; B64C 27/12
See application file for complete search history.

(56) References Cited

U.S. PATENT DOCUMENTS

| | | | | | |
|---|---|---|---|---|---|
| 1,871,417 | A | * | 8/1932 | Mansur | F16H 55/06 74/445 |
| 2,720,119 | A | * | 10/1955 | Sherman | F16H 55/16 264/262 |
| 2,748,618 | A | * | 6/1956 | Lee | F16H 55/12 74/439 |
| 3,013,440 | A | * | 12/1961 | White | F16H 55/06 29/450 |
| 3,557,423 | A | * | 1/1971 | Wolfe et al. | B23K 1/0008 148/529 |
| RE27,659 | E | * | 6/1973 | Wolfe et al. | B21D 53/26 148/528 |

(Continued)

OTHER PUBLICATIONS

Handschuh et. al., Hybrid Gear Preliminary Results, available at http://ntrs.nasa.gov/archive/nasa/casi.ntrs.nasa.gov/20120005332.pdf.

(Continued)

*Primary Examiner* — Zakaria Elahmadi
(74) *Attorney, Agent, or Firm* — Lightfoot & Alford PLLC

(57) ABSTRACT

According to one embodiment, a gear includes a steel portion that is oriented on a center axis. The steel portion includes a hub, a cylindrical rim, a web, and a plurality of engagement features. The hub is centered about the center axis. The rim has an exterior surface and an interior surface that surrounds the hub and is centered about the center axis. The web extends from an exterior surface of the hub to the interior surface of the rim. The engagement features are on the exterior surface of the cylindrical rim. The gear also includes a first composite piece adjacent to a first side of the web, the first composite piece extending from the hub to the interior surface of the rim, wherein the first composite piece does not extend past the hub towards the center axis.

7 Claims, 9 Drawing Sheets

(56) References Cited

U.S. PATENT DOCUMENTS

| | | | | |
|---|---|---|---|---|
| 4,326,849 | A * | 4/1982 | Van Zijderveld | F16H 55/12 403/365 |
| 5,271,287 | A * | 12/1993 | Wadleigh | B23K 20/12 474/152 |
| 6,644,431 | B2 * | 11/2003 | Kuze | B62D 5/0409 180/444 |
| 6,755,094 | B2 * | 6/2004 | Rehle | F16F 15/10 74/443 |
| 9,296,157 | B1 * | 3/2016 | Handschuh | B29C 70/84 |
| 2007/0221438 | A1 * | 9/2007 | Bernhard | F16H 55/12 180/444 |
| 2012/0000307 | A1 * | 1/2012 | Oolderink | B29C 37/0082 74/425 |
| 2013/0143704 | A1 * | 6/2013 | Blank | B62M 9/10 474/161 |
| 2015/0007680 | A1 * | 1/2015 | Hashimoto | F16H 55/06 74/434 |
| 2015/0174804 | A1 * | 6/2015 | Motoda | F16H 55/06 74/434 |
| 2016/0062299 | A1 * | 3/2016 | Hirose | F16H 1/00 74/434 |
| 2016/0327145 | A1 * | 11/2016 | Yanagisawa | F16H 55/06 |

OTHER PUBLICATIONS

Sara Black, New aerocomposites niche: Helicopter transmission gears?, CompositesWorld.com, http://www.compositesworld.com/articles/new-aerocomposites-niche-helicopter-transmission-gears (last visited Jun. 8, 2015).

* cited by examiner

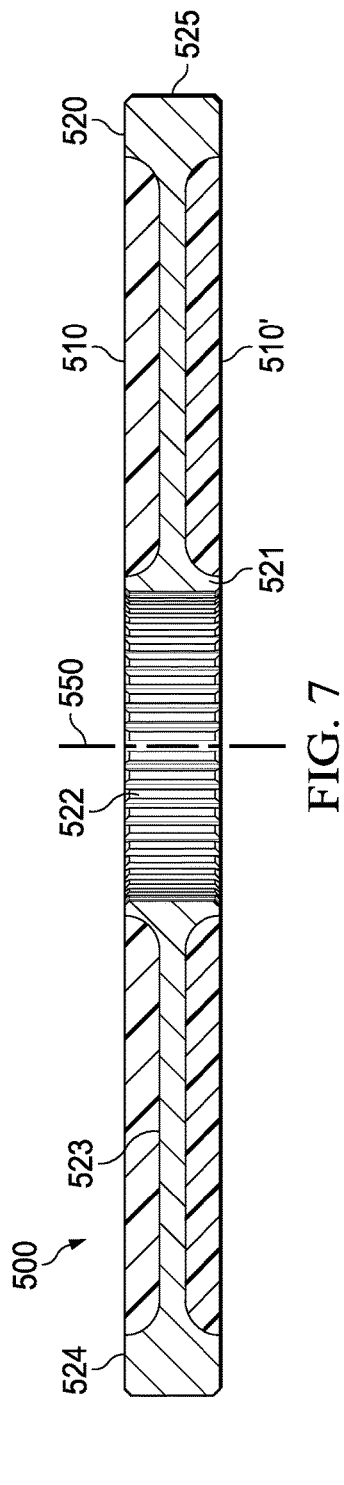
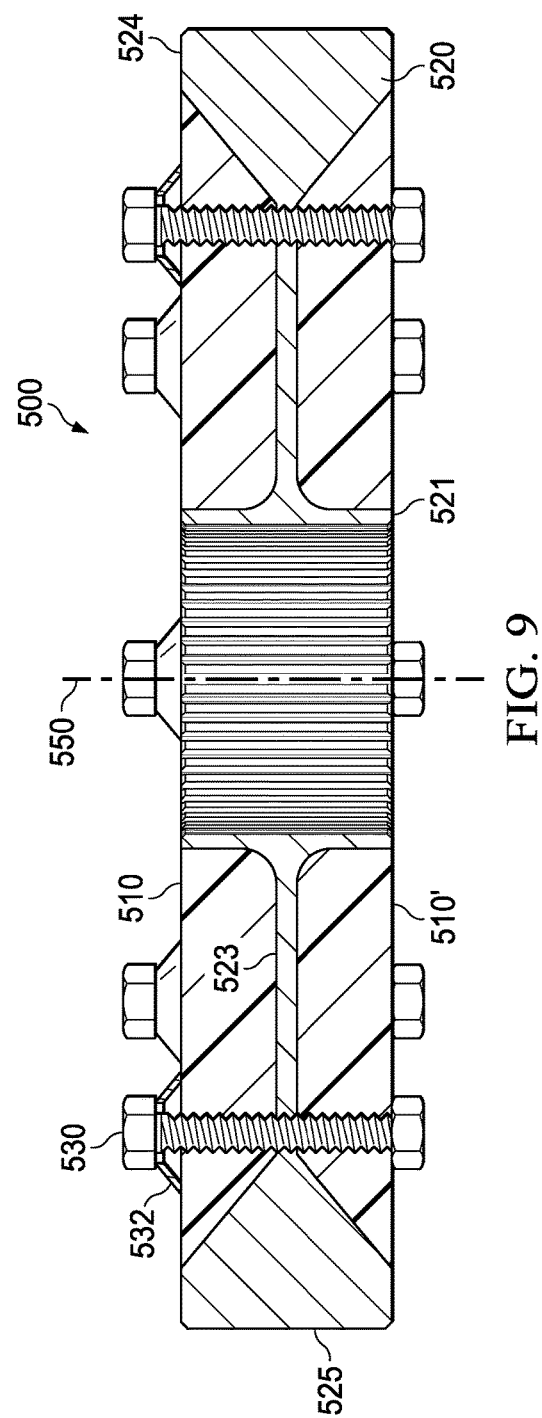

US 10,371,243 B2

COMPOSITE AND METAL HYBRID GEAR

TECHNICAL FIELD

This invention relates generally to a rotorcraft, and more particularly, to a hybrid composite and metal gear for a gearbox of a rotorcraft.

BACKGROUND

A rotorcraft may include one or more rotor systems. One example of a rotorcraft rotor system is a main rotor system. A main rotor system may generate aerodynamic lift to support the weight of the rotorcraft in flight, and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include a gearbox that transmits energy from a power source to the rotor blades.

SUMMARY

Particular embodiments of the present disclosure may provide one or more technical advantages. A technical advantage of one embodiment may include the capability to reduce the weight of a gearbox. A technical advantage of one embodiment may include the capability to reduce the cost of manufacturing a gear. A technical advantage of one embodiment may include the capability for a composite and metal hybrid gear to withstand a loss of lubrication event in a gearbox. A technical advantage of one embodiment may include the capability for a composite and metal hybrid gear to reduce gear meshing vibration and noise.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 7 shows a cross-section view of the composite and metal hybrid gear of FIG. 5, according to one example embodiment;

FIG. 9 shows a cross-section view of the composite and metal hybrid gear of FIG. 8, according to one example embodiment;

DETAILED DESCRIPTION OF THE DRAWINGS

Figure 1:
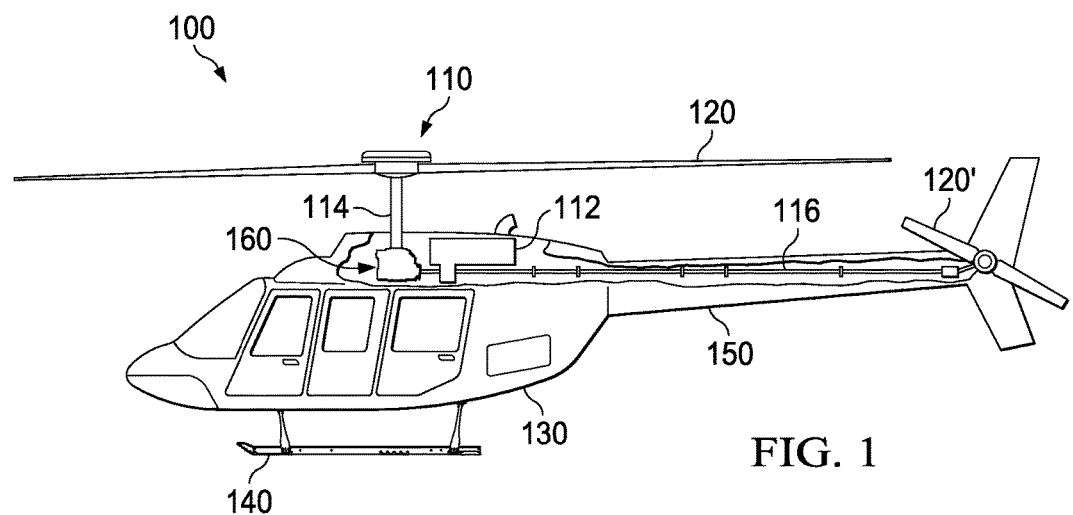
FIG. 1 shows a rotorcraft, according to one example embodiment.
Figure 2:
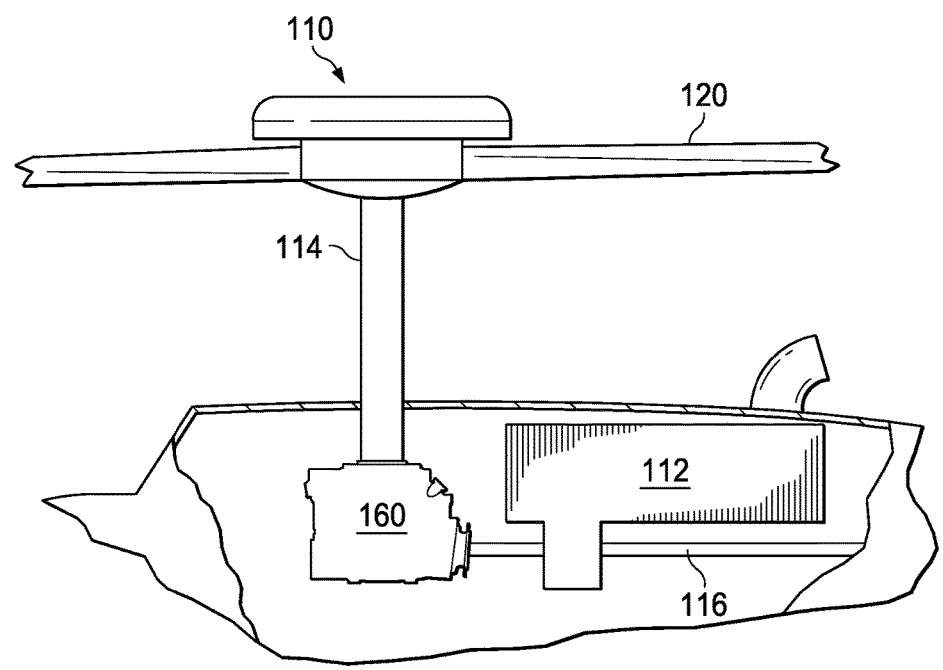
FIG. 2 shows the power train system of the rotorcraft of FIG. 1, according to one example embodiment.

FIG. 1 shows a rotorcraft 100 according to one example embodiment. Rotorcraft 100 features power train system 110, main rotor blades 120, tail rotor blades 120', a fuselage 130, a landing gear 140, and an empennage 150. Power train system 110 may rotate blades 120 and/or blades 120'. FIG. 2 shows the power train system 110 of FIG. 1.

In the example of FIGS. 1 and 2, power train system 110 includes an engine 112, a gearbox 160, a rotor mast 114, and a tail rotor drive shaft 116. Engine 112 supplies torque to mast 114, via gearbox 160, for rotating of blades 120. Engine 112 also supplies torque to tail rotor drive shaft 116 for rotating blades 120'. In the examples of FIGS. 1 and 2, gearbox 160 is a main rotor transmission system. Teachings of certain embodiments recognize, however, that power train system 110 may include more or different gearboxes than gearbox 160 shown in FIG. 1.

Fuselage 130 represents the body of rotorcraft 100 and may be coupled to power train system 110 such that power train system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features blades 120'. Power train system 110 and blades 120' may collectively provide thrust in the same direction as the rotation of blades 120 to counter the torque effect created by blades 120. It should be appreciated that teachings from rotorcraft 100 may apply to aircraft other than rotorcraft, such as tilt rotors and unmanned aircraft. In addition, teachings of certain embodiments relating to rotor systems described herein may apply to power train system 110 and/or other power train systems, including but not limited to non-rotorcraft power train systems.

A gearbox, such as gearbox 160, may transmit power from a power source (e.g., engine 112) to an object to be moved. One example of a gearbox may include a gearbox that can be configured to reduce the speed of the rotational output of the engine.

A gearbox may include various gears. A gear is a rotating part having engagement features, such as teeth or notches, that mesh with another part, that also has engagement features, to transmit torque. Gears in a gearbox may be used to provide speed and torque conversions. There are different types of gears that may be used in a gearbox, such as gearbox 160. The different types of gears that may be used in a gearbox may include a spur gear, helical gear, bevel gear, or a ring gear.

In rotorcraft, the power-to-weight ratio may be one of the most critical performance metrics. Since the drive system may be a large percentage of the overall rotorcraft vehicle weight, it may be beneficial to reduce the weight of rotorcraft drive system components in order to increase the power-to-weight ratio of the rotorcraft. One method of reducing the weight of a rotorcraft drive system may be to use a composite and metal hybrid gear in lieu of an all-metal gear.

Figure 3:
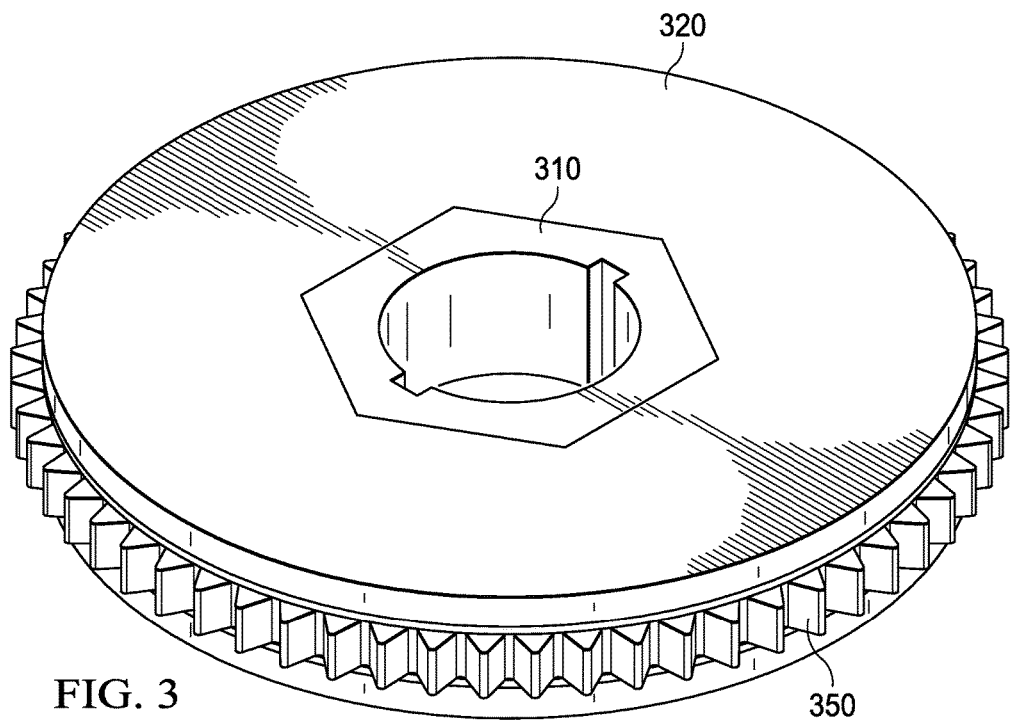
FIG. 3 shows a perspective view of a composite and metal hybrid gear, according to one example embodiment.
Figure 4:
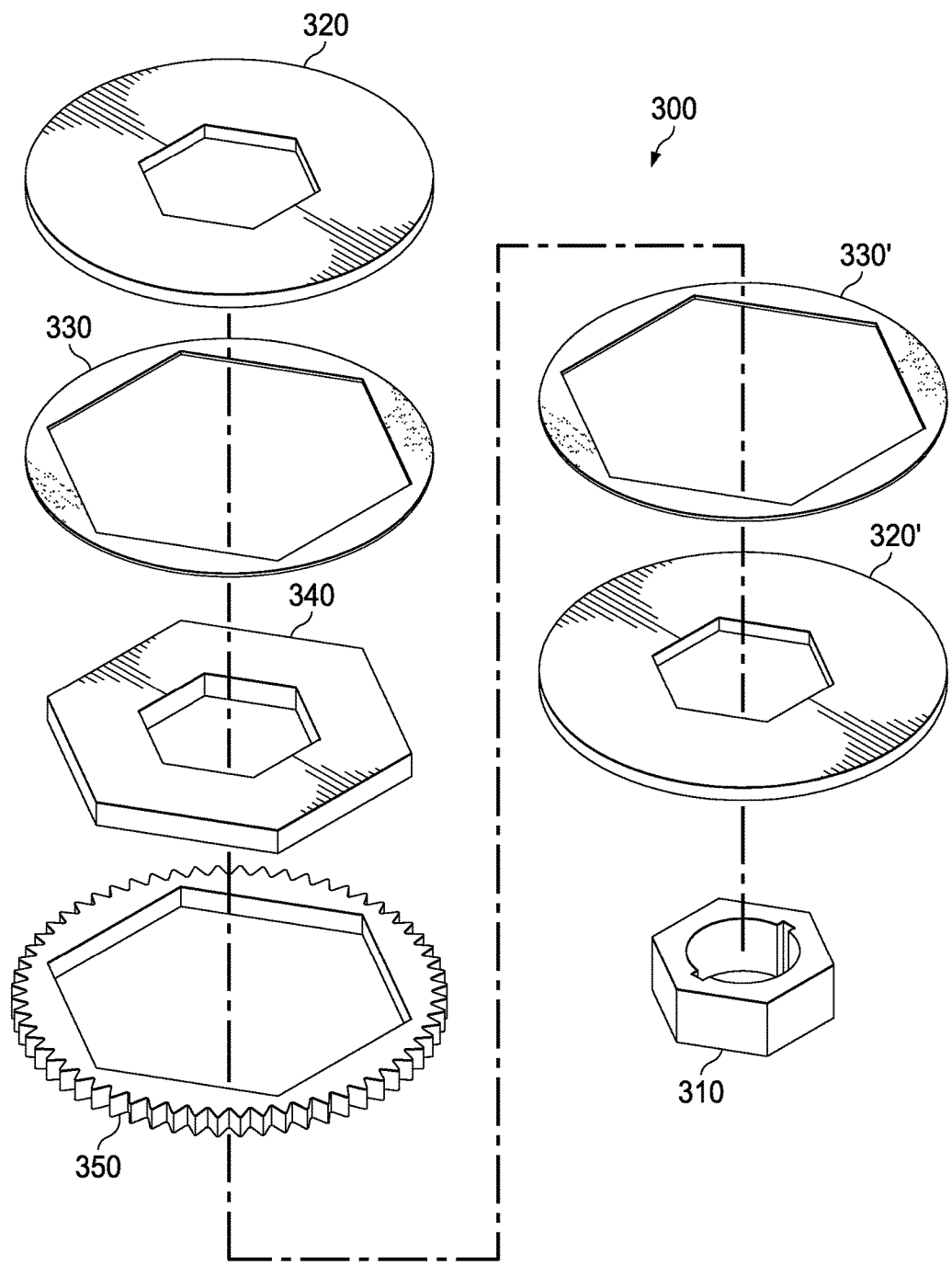
FIG. 4 shows an exploded view of the composite and metal hybrid gear of FIG. 3, according to one example embodiment.

FIGS. 3 and 4 show an example of a composite and metal hybrid gear, gear 300. Gear 300 may include a hub 310, composite pieces 320 and 320', adhesive film 330 and 330', composite web 340, and gear rim 350.

Hub 310 and gear rim 350 may be manufactured out of steel bar stock or a steel forging and may have engagement features, such as teeth or indentations, which can be configured to transfer torque. The steel may be gear steel such as carburizing steel or low alloy nitriding grade steel.

Composite pieces 320 and 320', and composite web 340 may be manufactured from a plurality of layers of "pre-preg," which may represent carbon fibers that are pre-impregnated with an epoxy, in conjunction with a quasi-isotropic braided fabric. Teachings of certain embodiments may recognize that quasi-isotropic braided fabric provide nearly in-plane isotropic properties that react similarly to that of the metallic features. Composite pieces 320 and 320' may be debulked in order to prevent wrinkles and to promote adhesion.

Gear 300 may be assembled by placing metal hub 310 through the center of composite piece 320 and then placing adhesive film 330 on top of composite piece 320. Next, gear rim 350 may be placed on top of adhesive film 330 and composite web 340 may be placed in the void between metal hub 310 and gear rim 350. Then, adhesive film 330' may be placed on gear rim 350, followed by placing composite piece 320' onto adhesive film 330'.

Gear 300 may then be placed into a press and cured with heat and pressure. Gear 300 and the press may be heated at a ramp rate of four-degrees Fahrenheit per minute to a temperature of two-hundred fifty degrees Fahrenheit. A one-hour dwell may be held at two-hundred fifty degrees Fahrenheit to allow time for the metal and composite to reach a consistent temperature. Once the temperature is consistent throughout, the temperature may be increased to three-hundred fifty degrees Fahrenheit to fully cure the composite pre-preg. After the cure cycle is complete, gear 300 may be returned to room temperature and any excess resin flashing may be removed.

Gear 300 may have potential benefits. One potential benefit of gear 300 is that it may reduce gear meshing vibration and noise by altering the acoustic path between the gear mesh generating the noise and the housing (not illustrated) that radiates the vibration and noise. Another potential benefit of gear 300 is that it may be possible to produce a composite and metal hybrid gear at a reduced cost, as a portion of the machining required to reduce component weight would be eliminated. Yet another potential benefit of gear 300 may be a reduction of weight of approximately twenty percent, which may result an increase to the power-to-weight ratio of a rotorcraft, such as rotorcraft 100.

Even though gear 300 may have potential benefits, gear 300 may also have certain drawbacks that may be improved upon by certain embodiments described or contemplated below. One potential negative aspect of gear 300 may be that the coefficient of thermal expansion difference between composite and steel may cause composite piece 320 and 320' to become unbonded from gear rim 350 when gear 300 is subjected to high temperatures. This separation may cause the load from metal hub 310, through composite pieces 320 and 320', to gear rim 350 to decrease while the load from metal hub 310, through composite web 340, to gear rim 350 to increase. This altering of the load path may ultimately cause gear 300 to fail. The risk of composite piece 320 and 320' becoming unbonded from gear rim 350 may be higher during extreme thermal events such as when the gearbox has a reduction or loss of lubrication pressure. Accordingly, a new design for a composite and metal hybrid gear is needed.

Figure 5:
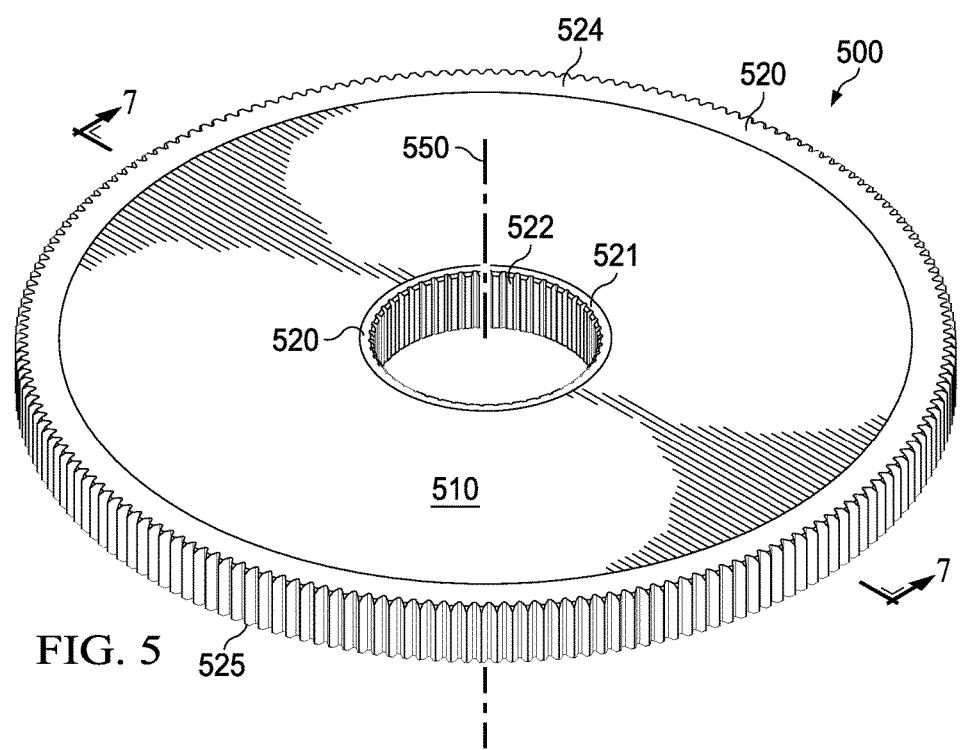
FIG. 5 shows a perspective view of a composite and metal hybrid gear, according to one example embodiment.
Figure 6:
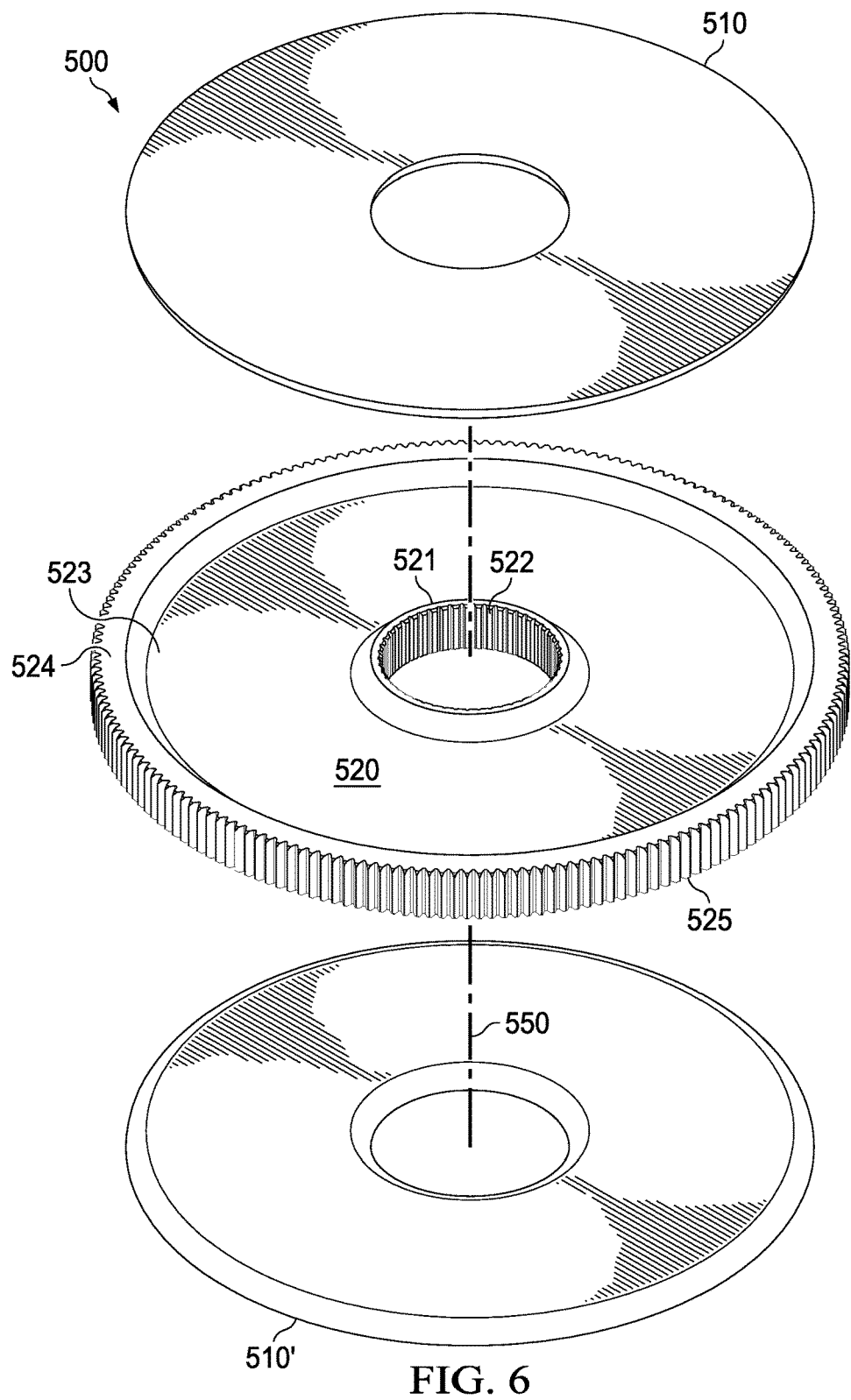
FIG. 6 shows an exploded view of the composite and metal hybrid gear of FIG. 5, according to one example embodiment.

FIGS. 5-7 show a composite and metal hybrid gear, according to one example embodiment. Gear 500 may include composite pieces 510 and 510', and steel portion 520. Steel portion 520 may include hub 521, web 523, and rim 524. Hub 521 and rim 524 may include engagement features, such as teeth 522 and 525, respectively, or another feature, such as notches, that can be configured to transmit torque to other components. Hub 521 and rim 524 may be centered around center axis 550. Gear 500 may be symmetrical on center axis 550 and an axis perpendicular to axis 550.

In some example embodiments, steel portion 520 includes web 523. Web 523 may be a thin portion of steel portion 520 that extends from rim 524 to hub 521. The shape of web 523 can be varied depending on the implementation or certain factors, such as the expected temperatures of the gear while in use and the expected load through the part.

In some examples, steel portion 520 is manufactured out of a metal forging or bar stock. The metal may be gear steel, such as carburizing steel or a low alloy nitriding grade steel. Features such as hub 521, teeth 522 and 525, web 523, and rim 524 may be machined into the steel forging or bar stock.

In certain embodiments, steel portion 520 may undergo certain material processing of all or some features of steel portion 520. For example, certain features may be carburized, hardened, shot-peened, and/or nitrited. Additionally, some features, such as web 523, may be sandblasted and/or surface-primed to promote adhesion of composite pieces 510 and 510', which will be discussed in more detail below.

In one example embodiment, composite piece 510 may be installed on web 523 of steel portion 520. Composite piece 510 may be installed by laying-up pre-preg carbon fiber directly on web 523. Composite piece may be formed such that composite material fills in the indentations that were created by the formation of web 523. In one example embodiment, an adhesive layer or an adhesive film is applied between composite piece 510 and steel portion 520. The method of installing composite piece 510 may be repeated for composite piece 510'.

In one example embodiment, a press may be used to firmly press the composite pieces 510 and 510' against steel portion 520, once composite pieces 510 and 510' have been laid-up on the surfaces of web 523. The press and gear 500 may be placed in an autoclave so that composite pieces 510 and 510' are cured with heat and pressure. The composite pieces 510 and 510' may be heated at a ramp rate of approximately four-degrees Fahrenheit per minute until it reaches a temperature of approximately two-hundred fifty degrees Fahrenheit. Then, gear 500 may be held at this temperature for approximately one hour. Afterwards, the temperature is increased to three-hundred fifty degrees until the epoxy in the pre-preg is fully cured. Once gear 500 is cooled to room temperature, gear 500 can be removed from the press and any excess resin flashing may be removed from gear 500.

Figure 8:
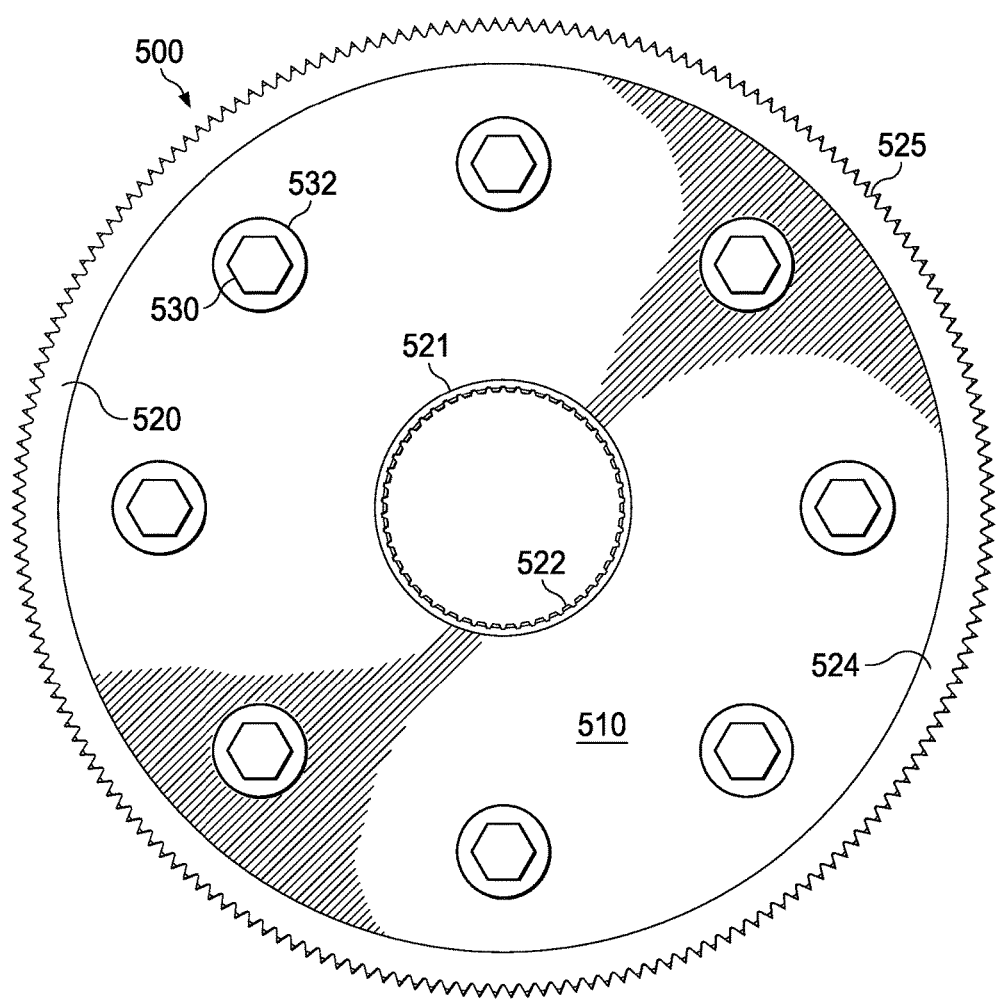
FIG. 8 shows a top view of a composite and metal hybrid gear, according to one example embodiment.

FIGS. 8 and 9 show gear 500, according to one example embodiment. In the example of FIGS. 8 and 9, a plurality of holes may be drilled through gear 500 in order to accommodate fasteners. Fasteners 530 may be added to further secure composite pieces 510 and 510' to steel portion 520. For example, at high temperatures, such as around six-hundred degrees Fahrenheit, the risk of composite pieces 510 and 510' being separated from steel portion 520 may be heightened. If gearbox 160 has a reduction or loss of lubricant pressure, temperatures in gearbox 160 may increase to approximately six-hundred degrees Fahrenheit. Accordingly, the use of fasteners 530 may be more important if there is a risk of reduction or loss of lubricant pressure. In some examples, a belleville washer 532 may also be used on each fastener 530 to apply a pre-load to fastener 530.

Figure 10:
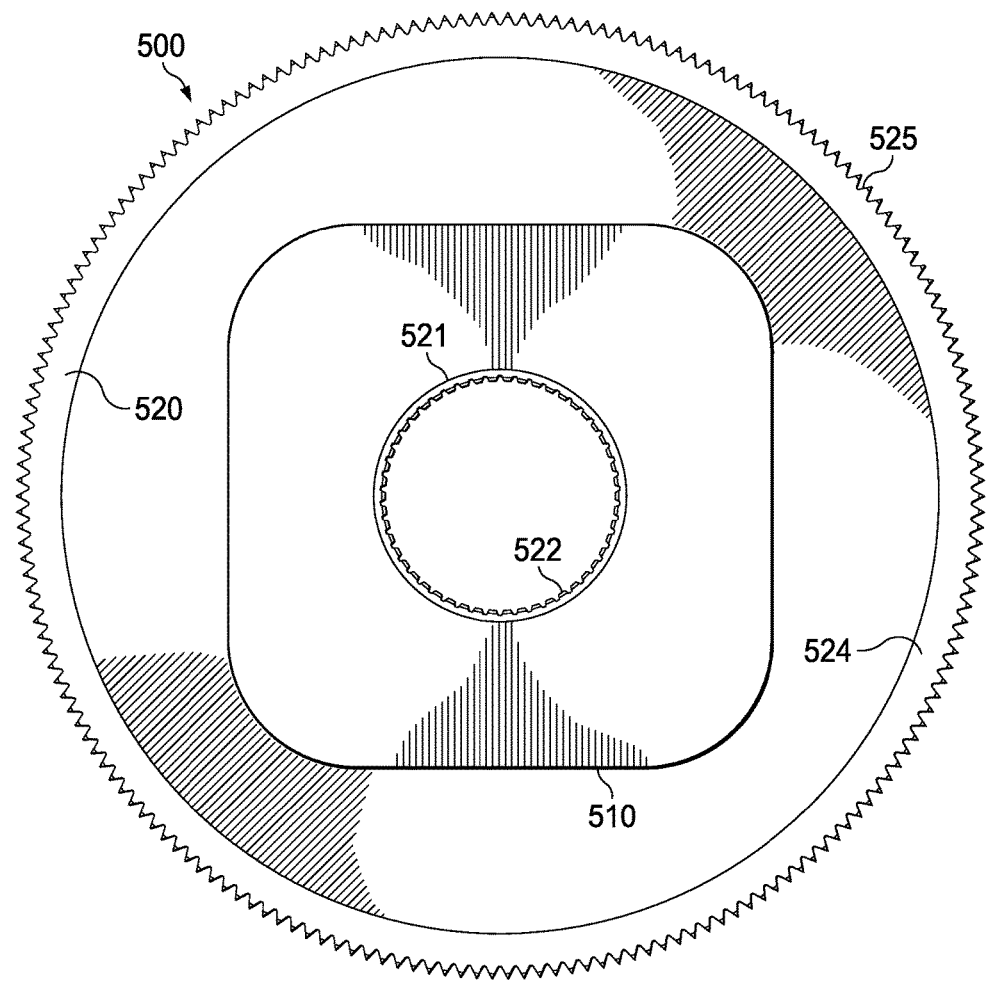
FIG. 10 shows a top view of a composite and metal hybrid gear, according to one example embodiment.

The shape of some components of gear 500 may be implementation specific. For example, FIG. 10 shows a gear where composite piece 510 is a rounded square, as opposed to circular. Other components, such as web 520 and hub 521, may also be a rounded square, as opposed to circular. In one example, composite pieces 510 and 510' are conical in shape. Other shapes, such as pentagons and hexagons may be used. In yet another example, an angled scarf joint exists between steel portion 520 and composite pieces 510 and 510'. The scarf joint between steel portion 520 and composite pieces 510 and 510' may increase the performance of the bond between the steel portion 520 and composite pieces 510 and 510' because the angle creates a bonded joint in shear rather than in tension.

Figure 11:
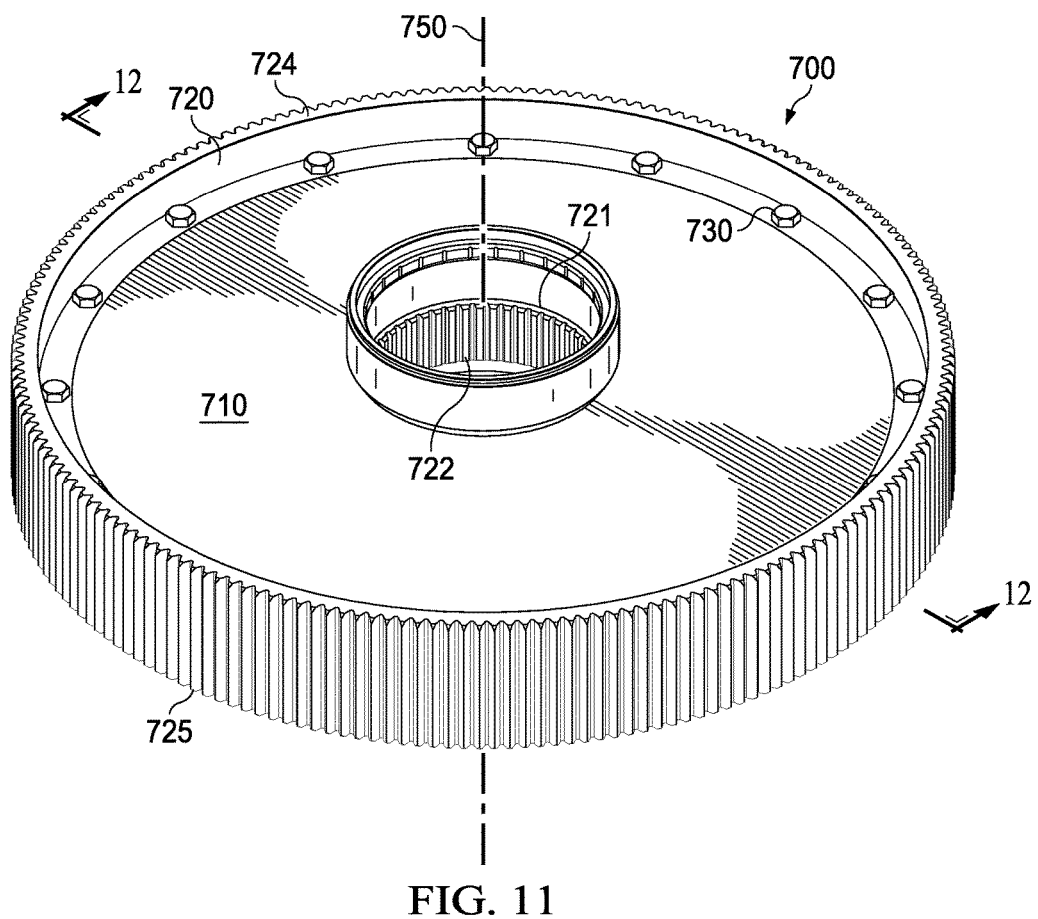
FIG. 11 shows a perspective view of a composite and metal hybrid gear, according to one example embodiment.
Figure 12:
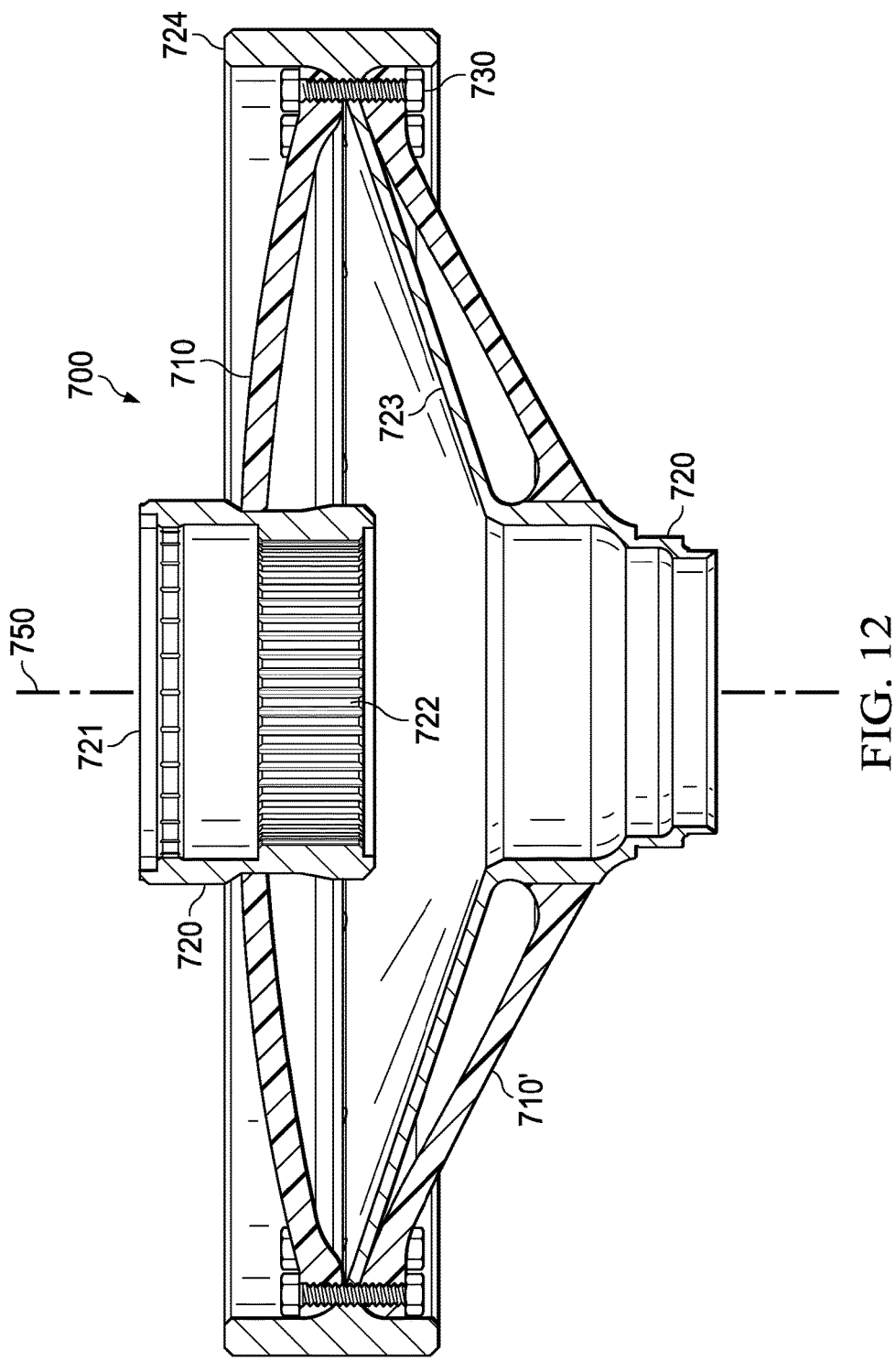
FIG. 12 shows a cross-section view of the composite and metal hybrid gear of FIG. 11, according to one example embodiment.

FIGS. 11 and 12 show a composite and metal hybrid gear, gear 700, according to an example embodiment. Gear 700 may feature composite pieces 710 and 710', and steel portion 720. Steel portion 720 may include hub 721, web 723, and rim 724. Hub 721 and rim 724 may include teeth 722 and 725, respectively, or another feature that can be configured to transfer torque. Hub 721 and rim 724 may be centered on center axis 750. Gear 700 may be symmetrical on center axis 750. Gear 700 may also include a plurality of fasteners 730.

Steel portion 720 may be manufactured in a similar fashion as steel portion 520 of gear 500. Once steel portion 720 is manufactured, portions of steel portion 720 may be sandblasted and surface-primed to promote adhesion of composite pieces 710 and 710', which will be discussed in more detail below.

Composite pieces 710 and 710' may be manufactured from a plurality of layers of "pre-preg," which can be carbon fibers that are pre-impregnated with an epoxy, in conjunction with a quasi-isotropic braided fabric. Composite pieces 710 and 710' may each be a conical shape that spans from hub 721 to rim 724. The layers of pre-preg may be laid-up on molds to form the conical shape of composite pieces 710 and 710'. Once the pre-preg is placed on the molds, the composite pieces 710 and 710', while still in the mold, can be cured. Composite pieces 710 and 710' may be cured similarly to how composite pieces 510 and 510' of gear 500 may be cured.

Once composite pieces 710 and 710' are cured, an adhesive film may be placed on steel portion 720 on what will be the interfacing portions between composite pieces 710 and 710', and steel portion 720. Next, composite pieces 710 and 710' may be placed in gear 700.

As stated, composite pieces 710 and 710' may be conical. This conical shape of composite pieces 710 and 710' may create an angled scarf joint between steel portion 720 and composite pieces 710 and 710'. The scarf joint between steel portion 720 and composite pieces 710 and 710' may increase the performance of the bond between the steel portion 720 and composite pieces 710 and 710' because the angle creates a bonded joint in shear rather than in tension.

In one embodiment, a plurality of holes are drilled on the perimeters of composite pieces 710 and 710', and web 723 in order to accommodate a fastener 730 in each of the holes. Fastener 730 may secure composite pieces 710 and 710' onto web 723. In some examples, a belleville washer may be used with each fastener 730 in order to provide a preload to fastener 730.

Even though a composite and metal hybrid gear is exceptionally beneficial for rotorcraft, the embodiments described would also be beneficial for gears used in other types of vehicles or machines.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A gear, comprising:
   steel portion oriented on a center axis, the steel portion comprising:
   a hub centered about the center axis;
   a cylindrical rim having an exterior surface and an interior surface that surrounds the hub and is centered about the center axis;
   a steel web extending from an exterior surface of the hub to the interior surface of the cylindrical rim; and
   a plurality of engagement features on the exterior surface of the cylindrical rim; and
   a first composite piece adjacent to a first side of the steel web, the first composite piece extending from the hub to the interior surface of the cylindrical rim, wherein the first composite piece does not extend past the hub towards the center axis;
   wherein the first composite piece is angularly symmetrical about the center axis so that the first composite piece can be assembled axially and radially between the cylindrical rim and the hub without regard to an angular orientation of the first composite piece relative to either of the cylindrical rim and the hub.

2. The gear of claim 1, further comprising a second composite piece adjacent to a second side of the steel web, the second composite piece extending from the hub to the interior surface of the cylindrical rim, wherein the second composite piece does not extend past the hub towards the center axis.

3. The gear of claim 2, wherein the gear is symmetrical on both the center axis and an axis perpendicular to the center axis.

4. The gear of claim 1, wherein the gear further comprises an adhesive film located between the first composite piece and the steel web.

5. The gear of claim 1, further comprising a plurality of fasteners that pass through the first composite piece and the steel web, the fasteners coupling the first composite piece to the steel web.

6. The gear of claim 5, further comprising a plurality of belleville washers, each belleville washer associated with a fastener.

7. The gear of claim 1, wherein the first composite piece is comprised of carbon fibers that are pre-impregnated with an epoxy.

* * * * *